United States Patent [19]

King et al.

[11] 4,111,274

[45] Sep. 5, 1978

[54] ELECTRICALLY-POWERED TRICYCLE

[75] Inventors: M. Dale King, 69 W. Center Ave., Maple Shade, N.J. 08052; Kerry Binder, Philadelphia, Pa.

[73] Assignee: M. Dale King, Maple Shade, N.J.

[21] Appl. No.: 603,758

[22] Filed: Aug. 11, 1975

[51] Int. Cl.[2] .......................... B62D 61/06; B60L 7/10

[52] U.S. Cl. ................................ 180/25 R; 180/65 R

[58] Field of Search ................ 180/65 R, 65 A, 25 R, 180/27, 34; 318/139

[56] References Cited

U.S. PATENT DOCUMENTS

| | | | |
|---|---|---|---|
| 1,291,233 | 1/1919 | Storer | 180/65 R |
| 3,171,505 | 3/1965 | Imelmann | 180/65 R |
| 3,219,137 | 11/1965 | Appleton | 318/139 |
| 3,223,908 | 12/1965 | Huchinson et al. | 318/139 |
| 3,264,540 | 8/1966 | Dannettell | 318/139 |
| 3,356,173 | 12/1967 | Holcomber | 318/139 |
| 3,713,502 | 1/1973 | Delaney et al. | 180/65 A |
| 3,809,978 | 5/1974 | Zubris | 318/139 |
| 3,827,519 | 8/1974 | Snider | 180/65 A |
| 3,899,041 | 8/1975 | Mager | 318/139 |
| 3,921,741 | 11/1975 | Garfinkle et al. | 180/65 A |

*Primary Examiner*—Joseph F. Peters, Jr.
*Assistant Examiner*—Donn McGiehan
*Attorney, Agent, or Firm*—Morton C. Jacobs

[57] ABSTRACT

A tricycle for adults having stable handling characteristics provides pedal drive and electrocmechanical drive for two-speed propulsion, coasting and braking.

8 Claims, 3 Drawing Figures

ELECTRICALLY-POWERED TRICYCLE

BACKGROUND OF THE INVENTION

Electrically-driven vehicles are increasingly popular because they use no gasoline which at times has been unavailable to the public and is becoming progressively more expensive. Electrically-driven vehicles are also quiet in operation and non-polluting of the surrounding atmosphere.

Electrically-driven tricycles powered by on-board storage batteries are suited for short distance commuter use. Its three wheels provide a degree of stability and safety not found in bicycles or motorcycles. It can be operated by people of all ages and by city dwellers who desire inexpensive, clean and quiet transportation. When fitted with a platform or basket, it is especially suited for neighborhood shopping and for the carrying of luggage, for mail service, for messengers, maintenance men and the like. Vehicles of this type are described in U.S. Pat. Nos. 3,369,629, 3,598,195 and 3,759,339.

Tricycles also have the advantage that one rear wheel can be used for an electrified drive while the other rear wheel can be used for the conventional pedal, sprocket and chain drive. By using the pedal drive, the range of an electrified vehicle can be extended before battery re-charging is necessary. The foot pedals can be used for starting heavy loads and on upgrades to prevent excessive current drain from the batteries. Handbrakes and coaster brakes as are usually found on tricycles and bicycles can be retained. Additionally, where a permanent magnet direct current motor is used, it is possible to achieve dynamic braking from the motor. Also, during periods of dynamic braking, it is possible to use the motor output to recharge the batteries which drive the motor in conventional operation.

The light weight of a tricycle, which is generally advantageous from the standpoint of conservation of the battery-stored energy, allows very rapid acceleration of the vehicle when the battery source is connected to the electric motor. However, with the electric motor connected to only one of the two rear wheels, rapid development of speed can have the disadvantage of causing the tricycle to swerve from its path of travel. While a skilled and experienced operator of the tricycle can maintain his proper course, there is a sensation of sidewise tugging and imbalance present because of the unevenness of transmission of power between the two rear wheels.

Electrified adult tricycles have been constructed to operate at several discrete speed levels. This allows proper selection of speeds by the operator in accordance with immediate driving conditions. For example, riding in city traffic may require a lower speed than riding in open suburban and rural areas. In the current art where the forward speed of the tricycle is varied by adjusting the voltage to the motor in discrete steps, there is a short interval when no voltage is applied to the motor as the switching device is transferred from a lower to a higher level and vice-verse. The forward motion of the tricycle is jerkey, uneven and uncomfortable for the rider when speed levels are changed, and short periods without electrical power occur.

Additionally, present electrified adult tricycles provide jerky and uncomfortable performance when running downhill. This can occur when the back electromotive force generated in the motor on downhill running exceeds the voltage available from the battery supply. At such speed and condition, the motor acting as a generator drives current back into the battery. In the process dynamic braking, desirable or not, is provided for the vehicle. The braking thus produced causes the vehicle to slow down; when the back electromotive force falls below the applied battery voltage, the motor reverses its generator action, acts again as a motor, and drives the bike forward at increasing speed until the process repeats itself. The result is an unpleasant ride.

What is needed is an electrified adult tricycle which can be driven either electrically or by foot pedal drive or by both simultaneously. Also, the tricycle should start and operate smoothly under electric power. It should have multispeed capability to adjust to riding conditions and provide high economy and long range in operation.

SUMMARY OF THE INVENTION

It is an object of this invention to provide a new and improved adult tricycle.

It is a further object of this invention to provide an adult tricycle which is smooth starting, smooth running and having multiple speed ranges.

It is a further object to provide an adult tricycle which provides economy and long range by allowing an option of free coasting or automatic maintenance of the desired speed level.

It is a further object to provide a tricyle which provides automatic dynamic braking when a maximum speed level is exceeded and which otherwise allows the operator a choice of pedal brake or electrical dynamic braking as appropriate under other conditions of operation.

In an embodiment of this invention a conventional adult tricycle with a single forward wheel and a pair of rear wheels is provided with a split rear axle. A conventional foot pedal drive with sprocket wheels, link chains and a conventional coaster brake mechanism rotates the right rear wheel and propels the vehicle. The left rear wheel is independently driven by a permanent magnet direct current (hereinafter DC) motor mounted behind and below the rear axle and connected to the wheel through a speed reducing gear box, sprocket wheels and link chain. Either motor or foot pedal driven can be used spearately or they can be used in combination to supplement each other.

The motor is powered by two 12-volt DC electric storage batteries of the automotive type mounted symmetrically on a framework structure suspended from the rear axle housings and the main frame. The battery locations, below and forward of the rear axle, provide a center of mass which is low and generally centered between the front and rear wheel axles whereby dynamic stability of the vehicle in turning and acceleration is achieved.

There are a plurality of modes of battery-powered operation. The electrical control circuits provide, at the operator's choice, either 12-volt or 24-volt DC for operation within low- and high-speed ranges, respectively. Automatic dynamic braking with concurrent battery recharging is activated when the tricycle exceeds its designed maximum powered speed. A generally constant intermediate design speed is maintainable automatically with auto-selected periods of intermittent electrical braking and powered drive as required to achieve constant speed. Another operational mode provides automatic coasting when the intermediate design speed is exceeded thereby conserving battery energy and extending the vehicle's operating range. Starting and transition between powered drive and free coasting is smooth; operation is quiet, non-polluting and economical. During periods of coasting, diodes in the electrical circuits prevent current reversal, and attendant dynamic braking. Electrical braking (dynamic braking) is quick, smooth and effective in slowing the vehicle while simultaneously recharging the battery.

BRIEF DESCRIPTION OF THE DRAWING

The foregoing and other objects of this invention, as well as various features thereof, may be more fully understood from the following description when read together with the accompanying drawing, in which.

In the drawing corresponding parts are referenced by similar numerals throughout. Figures are not to scale and for clarity of illustration, scale varies between views.

DESCRIPTION OF A PREFERRED EMBODIMENT

Figure 1:
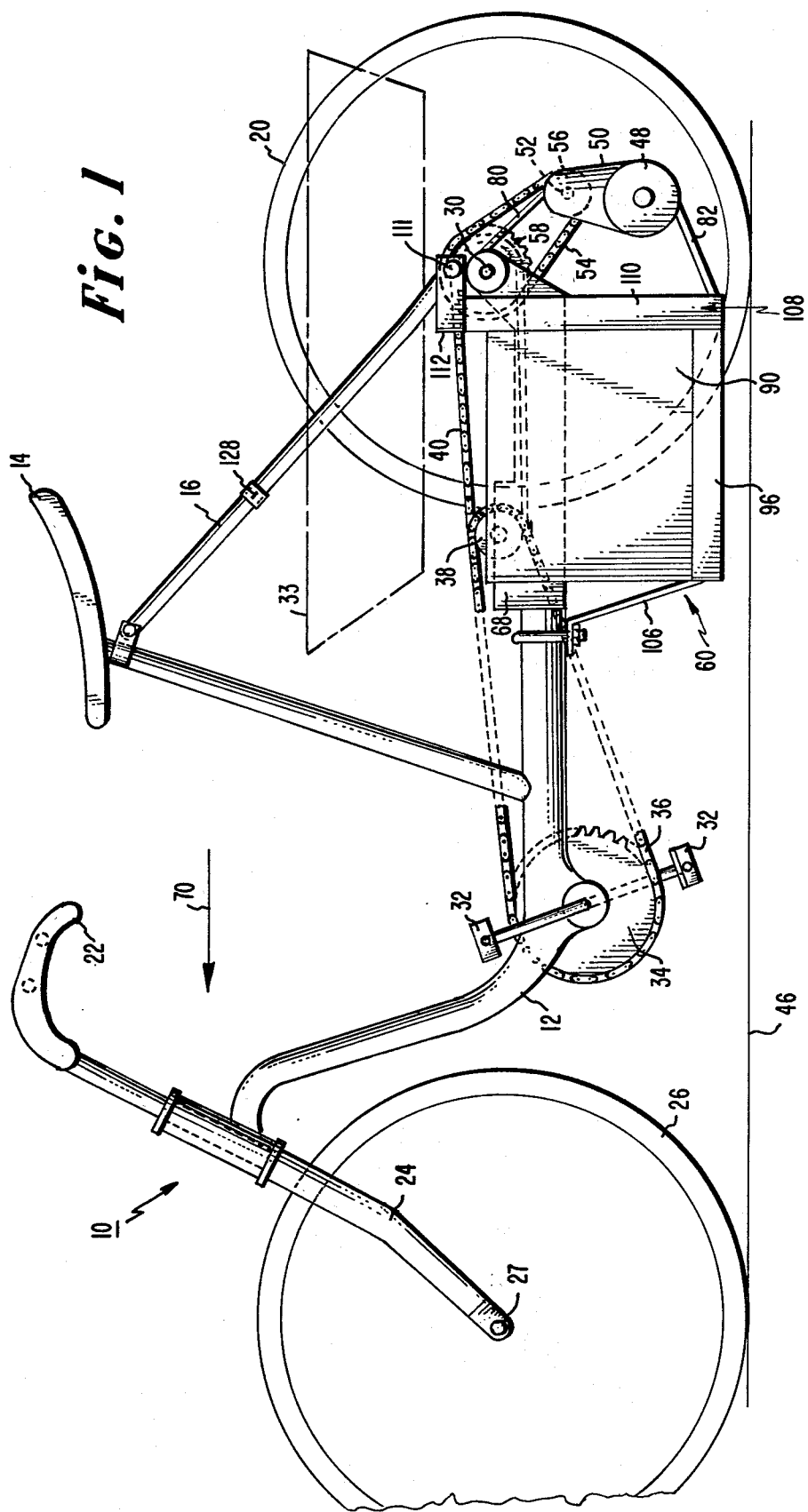
FIG. 1 is a left side elevational view of the tricycle of this invention with parts omitted.
Figure 2:
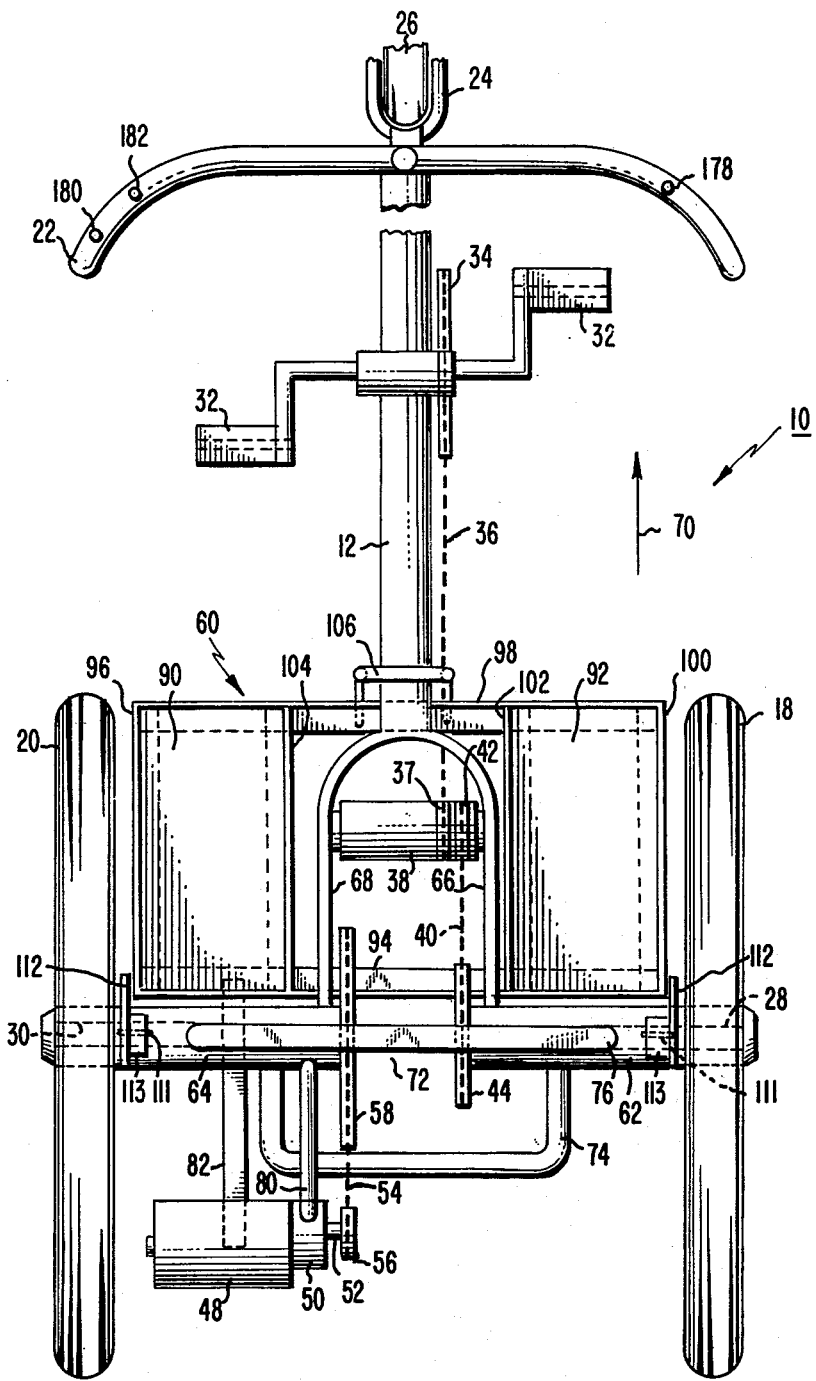
FIG. 2 is a top view of the tricycle of FIG. 1 with parts omitted and fragmented.

In an embodiment FIGS. 1, 2 of this invention a tricycle 10 having a tubularly constructed main framework sized to accommodate an adult operator is comprised of the main frame 12, seat 14 with supports 16, a pair of similar rotatable, tired, rear wheels 18, 20, conventional handle bars 22 cooperating with a conventional steering fork 24 and a steerable, tired, front wheel 26 supported between the steering fork tines and rotatable on its axle 27. The rear wheels 18, 20 rotate individually on independent axles 28, 30. Conventional pedals 32, engaging a conventional main sprocket wheel 34 provide means for foot-powered propulsion. A basket 33 is positioned by mounts (not shown) between the rear wheels 18, 20. The pedals 32 and main sprocket wheels 34 cooperate via a link chain 36 with a coaster brake mechanism 38 of known design whose powered output transmits rotational energy via a second link chain 40 and sprocket wheels 42, 44 to the right rear wheel axle 28 and wheel 18.

Using the pedal mode of operation the vehicle 10 described above operates normally in any of three conditions, namely, (a) powered propulsion wherein the pedals 32 are rotated by the operator's feet and the right rear wheel 18 transmits energy to the ground surface 46; (b) free-coasting wherein the pedals 32 are not rotating while the vehicle 10 moves ahead on its own momentum and (c) braking wherein the operator applies pressure on the pedals 32 in a reversed direction from that used in normal forward propulsion in order to slow or stop the vehicle 10.

The left rear wheel 20 of the tricycle 10 of this invention is driven by a permanent magnet DC electric motor 48 which has its rotating shaft speed reduced by a gear box 50, an integral part of the motor 48. The gear box output shaft 52 cooperates with the left rear wheel 20 and axle 30 via a link chain 54 and pair of sprocket wheels 56, 58.

The DC motor 48 receives its energy from a battery array which is supported from the main frame 12 and axle housings 62, 64 of the tricycle. The several modes of electrical operation, the controls and circuits related thereto are more fully explained hereinafter. Both high-speed and low-speed electric operation are provided as well as automatic and manually-selected dynamic braking. Electric drive is used as the sole propulsion means or electric drive is used in combination with simultaneous pedal operation. The separate rear axles 28, 30, provide independent rotation for each rear wheel 18, 20 thereby preventing wheel skidding during turning maneuvers.

The central main frame 12 is oriented in the direction of straight forward motion 70 of the vehicle 10 with interconnecting members 66, 68 between the main frame and the axle housings 62, 64 diverging to create a fork; the coaster brake mechanism 38 of known design is attached between the separated members 66, 68.

For structural strength and rigidity the space 72 between the inward ends of the axle housings 62, 64 is bridged by a generally U-shaped horizontal brace 74 and a similar vertical brace 76.

The right rear axle 28 is supported within and extends at both ends from the right axle housing 62 which in turn is joined to the main frame 12 by interconnecting member 66. The rear right wheel 18 is attached by well-known means to the outside end of the axle 28; a sprocket wheel 44 is rigidly attached to the inside end of the axle 28.

A conventional sprocket wheel assembly 34 with a pair of attached pedals 32 is mounted to the main frame 12 in the usual manner. A link-chain 36 engages and passes around the primary sprocket wheel 34 and forms a closed loop around and engaging the input sprocket 37 of the coaster brake assembly 38. A second closed loop link-chain 40 engages and passes around the coaster brake output sprocket 42 and the sprocket wheel 44 that drives the extended left end of the right rear axle 28.

In the pedaling mode of operation power to turn the right rear wheel 18 is transmitted in the known manner from the foot through pedals 32, sprocket wheel 34 and chain 36 to the coaster brake assembly 38 and from said coaster brake assembly 38 to the rear wheel 18 via the second link chain 40 and sprocket wheels 42, 44. When the vehicle 10 is in forward motion 70 with pedals 32 held stationary by the feet of the operator, the tricycle 10 coasts with the right rear wheel sprocket 44 and coaster sprocket 42 turning freely. When reversed pressure is applied to the pedals 32, the coaster brake assembly 38 operating in a well-known manner retards or prevents rotation of the right rear wheel 18 and slows or stops the forward motion of the vehicle 10 depending on the amount of pressure applied.

The left rear axle 30 is supported within and extends at both ends from the left axle housing 64 which in turn is joined to the main frame 12 by an interconnecting member 68. The left wheel 20 is attached by known means to the outside end of the axle 30; a sprocket wheel 58 is rigidly attached to the inside end of the axle 30.

The DC motor 48 with integral gear box 50 is positioned below and behind the left rear axle housing 64 and is held in position by an upper brace 80 attached between the gear box 50 and left axle housing 64 and a lower brace 82 extending between the motor 48 and the rear member 94 of the battery support assembly 60. A sprocket wheel 56 is attached to the output shaft 52 of the gear box 50 and a closed-loop link-chain engages and passes over both the motor sprocket wheel 56 and the sprocket wheel 58 attached to the inner extended end of the left rear axle 30. By this means the left rear wheel 20 is rotated and the vehicle 10 is propelled forward when a DC voltage of proper magnitude and polarity is applied to the motor 48.

An array 60 comprised of two DC wet cell batteries 90, 92 of the automotive-type mounted on a framework powers the motor 48. These batteries 90, 92 rest on a battery support framework comprised of four angle sections 94, 96, 98, 100 joined perpendicularly to form a horizontal rectangular frame. One surface of each angle section stands vertically and the horizontal surface extends inwardly toward the opposed angle section. Two additional angle sections 102, 104 extend between the forward angle 98 and the rear angle 94 forming within the larger rectangle two smaller rectangles in which the batteries 90, 92 are cradled. The left battery 90 rests upon the horizontal surfaces of four angles 94, 96, 98, 104 and is constrained from movement by the vertical surfaces of said angles which surround the base of the battery 90. The right battery 92 is similarly constrained by four angles 94, 98, 100, 102.

The horizontal battery support structure described above is attached to the main frame 12 of the vehicle 10 by a stirrup brace 106 which connects at the center of the forward angle section 98 and loops over and rests on the tubular main frame 12. The two rear corners of the horizontal rectangular framework are attached to the axle housings 62, 64 by inverted "L"-shaped supports 108 comprised of a longer vertical angle section 110 joined at right angles to a shorter horizontal plate section 112. The shorter length plates 112 rest atop and are fastened by bolts 111 to bosses 113 on the top of the axle housings 62, 64. The vertical angle sections 110 nest with and are attached to the support structure angles 94, 96, 100 at the rear corners. The length of the vertical angles 110 and the stirrup brace 106 place the batteries 90, 92 substantially below the rear wheel axles 28, 30. Thus, the center of gravity of the vehicle 10 is lowered and battery weight is supported between the forward and rear wheel axles 27, 28, 30 whereby swerving of the vehicle 10 at electrical start-up (because of single-wheel power transmission) is minimized and stability in turning is improved.

Figure 3:
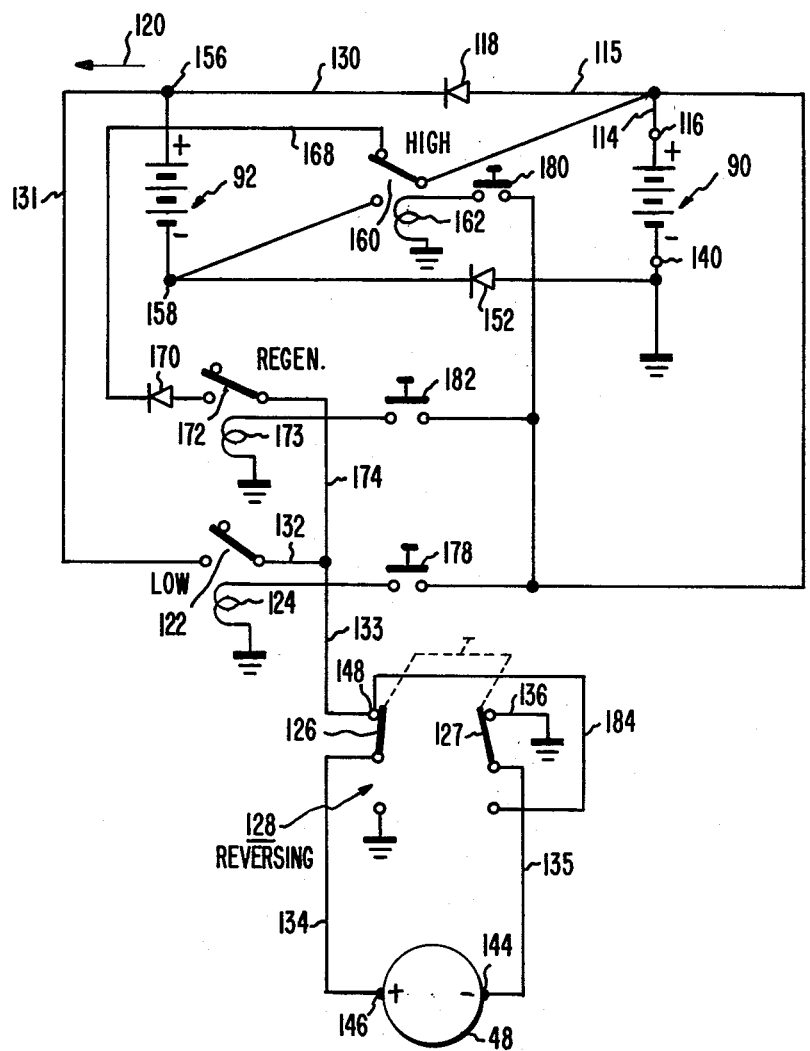
FIG. 3 is a schematic representation of the circuits used in electrically operating the tricycle of FIG. 1.

The electrical control schematic for the motor drive is shown in FIG. 3. A first battery 90 is in a circuit for energizing the motor 48 that extends from the battery's positive terminal 116, via diode 118 oriented to pass conventional current flow 120 from the battery 90, contacts of a first single-pole, single-throw (Low Speed) switch 122 controlled by an electrical relay 124, normally-closed contacts 126, 127 of a manually-operated double-pole double-throw reversing switch 128, the DC permanent magnet motor 48, and a further plurality of leads 130-136 connecting the above components in series. The lead 136 from the reversing switch 128 connects to a common ground, which is also connected to the negative terminal 140 of the first battery 90. The negative terminal 144 of the motor 48 is grounded through the normally-closed contact 127 of the reversing switch 128; the positive terminal 146 of the motor 48 connects to the Low Speed switch 122 through the other closed contact 126 of reversing switch 128. As connected in FIG. 3, the motor 48 operates to propel to tricycle 10 in the forward direction 70.

Another circuit places a second storage battery 92 in a generally parallel arrangement with the first battery 90. However, this circuit loop contains a diode 152 between the negative battery terminals 140, 158; the first diode 118, mentioned above, is between the positive terminals 116, 156 of the batteries 90, 92. The second diode 152 is oriented to pass conventional current flow from the ground to the negative terminal 158 of the second battery 92.

Additionally, the normally-open contacts of a single-pole double-throw (High Speed) switch 160, operated by a relay 162, are between the positive terminal 116 of the first battery 90 and the negative terminal 158 of the second battery 92. Finally, a lead 168 passes from the normally-closed contact of the single-pole double-throw (High Speed) switch 160 through a third diode 170, a normally-open second single-pole single-throw (Regen) switch 172, operated by relay 173, and a lead 174 from said switch 172 to the fixed contact 148 of the Reversing switch 128 which connects through closed contacts 126 to the motor 48.

The relay 124 is energized by an electrical button switch 178. This button 178 (providing Low-Speed control) when pressed completes a circuit joining the positive terminal 116 of the first battery 90 to one terminal of the relay 124, the other relay terminal being grounded. When so energized the relay 124 closes the contacts of the switch 122. Similarly, the other relays 162, 173 are energized by individual button switches 180, 182 (i.e., "High Speed" and "Regen" controls) to activate switches 160, 172, respectively.

With all of the button switches open (FIG. 3) the motor 48 is isolated from the batteries 90, 92 and nonoperating. The vehicle 10 can be pedaled, rolled, or coasted freely without either assistance or resistance from the motor 48 other than mere mechanical friction, e.g., in the various sprockets, link-chains, motor bearings.

For low-speed operation of the tricycle, the Low-Speed button 178, located on the right side of the handlebar 22 is depressed by the operator to energize the coil 124 and close the switch 122. This causes conventional current 120 to flow from the positive terminals 116, 156 of both batteries 90, 92 in parallel, through closed contacts of two switches 122, 128, and through the motor 48 to the ground return directly to the negative terminal 140 of the first battery 90, and via diode 152 to the negative terminal 158 of the second battery 92.

The tricycle 10 starts smoothly from a standstill because the normal inrush of current to the motor 48 when the vehicle 10 is started from rest is limited by the current carrying capacity of the diodes 118, 152 through which the current must flow. (R.C.A. diodes 1 N 11 83 A have provided suitable performance.) As the vehicle 10 achieves velocity, back EMF is generated in the motor 48 which limits the current flowing from the batteries 90, 92. With 12-volt batteries a nominal low speed of approximately 7 miles per hour (hereinafter mph) is achieved on a level surface. At higher speeds, caused by supplemental foot pedaling or rolling downhill, the back EMF induced in the motor 48 exceeds the battery voltage and tends to drive current in a reverse direction, however, the unidirectional current carrying characteristics of the diodes 118, 152 prevent a reversed flow of current to the batteries 90, 92. Thus, above the nominal low speed the motor 48 operates as an open-circuited generator in a no-load condition; its shaft 52 is turned freely by the sprocket wheels 56, 58 and link-chain 54 and the tricycle 10 coasts. Whenever forward speed falls below the nominal low speed (i.e., 7 mph) the battery voltage again exceeds the back EMF, and current flow from the batteries 90, 92 resumes automatically to smoothly increase the speed.

In the motor/coasting mode described above, when pedal or downhill speed is in excess of the operator's needs or desire, the tricycle 10 is slowed by depressing the regenerative braking (Regen) button 182 located on the left side of the handlebar 22. Activation of the Regen button 182 energizes the relay coil 173 and causes the contacts of the switch 172 to close, thereby completing a circuit for reverse current generated by the motor 48 (when back EMF exceeds the battery voltage). This reversed current leaves the motor terminal 146, flows through the reversing switch 128, the now closed switch 172, the diode 170 which is oriented to pass current in this direction, through closed contacts of the switch 160 into the positive terminal 116 of the first battery 90, through the first battery 90 and to ground from whence it returns to the motor 48 via the closed switch contact 127. Two effects from the reversed current flow are that: the first battery 90 is partially recharged, and the current flowing in the motor rotor induces a magnetic field which interacts with the existing permanent pole fields of the motor 48 to cause a resistance to rotation of the motor 48 and thereby a braking action for the vehicle 10 with some instant slowing effect. The higher the speed of the vehicle 10 and the higher the generated back EMF, the greater is the reversed current and the corresponding braking effect when the Regen button 182 is pressed. The second battery 92 is not recharged during regenerative braking because the diode 152 is effective in blocking a reversed current through said battery 92.

The circuit described above for regenerative braking is effective at speeds above the nominal low speed (7 mph) to retard the vehicle's motion whether or not the low speed button 178 is depressed. But the motor 48 never operates as a propulsion means unless low-speed button 178 is depressed. At very low speeds, e.g., less than 7 mph, when the voltage of the batteries 90, 92 exceeds the back EMF, there can be no regenerative braking effect; unintentional energizing of the motor 48 at such low speed conditions by depressing the Regen button 182 is prevented by the diode 170 in the Regen circuit which blocks current flow from the battery 90 to the motor 48. (Braking at velocities below 7 mph must be accomplished by applying reversed pressure to the conventional pedal-coaster brake mechanism 32, 34, 36, 38.)

By concurrent depression of both Low Speed and Regen buttons 178, 182, the vehicle 10 will operate automatically to provide a constant forward speed (i.e., that nominal low speed where back EMF approximately is equal to battery voltage). When vehicle speed increases above the nominal low speed, the back EMF will automatically cause regenerative braking (and recharging of the first battery 90) to occur as described above; when speed falls below the nominal low speed, the motor 48 will automatically commence operation from the batteries 90, 92 through the low-speed circuit described above. By this automatic alternation between the Low Speed and Regen modes, the circuit operates to maintain a constant speed of vehicle motion.

High-speed operation of the motor (and the vehicle) occurs when the two batteries 90, 92 operate in series to provide a higher voltage, i.e., 24 volts DC. This voltage is provided by depressing the High-Speed button 180 located on the left side of the handlebar 22 which energizes the relay coil 162 and moves contacts of the single-pole double-throw switch 160 so the positive terminal 116 of first battery 90 and the negative terminal 158 of second battery 92 are joined. The circuit to the Regen switch 172 is opened by this operation of the switch 160.

The diodes 118, 152 block a reversed current flow and prevent a short circuit of the batteries 90, 92. A voltage differential approximating the battery voltage, i.e., 12 volts DC, exists across each of said diodes 118, 152 of a polarity to prevent current flow; the diodes 118, 152 effectively provide open circuits.

Thus, with the High-Speed button 180 depressed, a high potential equal to the sum of the voltages of the two batteries 90, 92 is produced between the positive terminal 156 of the second battery 92 and ground. By concurrently pressing the Low-Speed button 178 this high voltage is applied to the motor 48 and current 120 flows. Inadvertent operation at high speed is prevented by the requirement that both High- and Low-Speed buttons 178, 180 be depressed simultaneously for high speed propulsion. These buttons are located on opposite sides of the handlebars 22 to assure that two hands are used for steering at high speeds and to prevent accidental depression of both buttons 178, 180 with one hand. It should be noted that in increasing speed from low to high (and vice-versa) the voltage from the batteries 90, 92 changes instantly from 12 to 24 volts without any interruption of power thus providing smooth and continuous propulsion, because the diodes 118, 152 remain conductive until switch 160 is closed to the series position, which reverse biases said diodes.

In the high speed, high voltage, mode of operation the vehicle achieves a nominal high speed of approximately 14 mph on a level surface. At excessive speeds, i.e., where the motor's back EMF exceeds the voltage of the batteries in series, a reverse current will flow from the motor terminal 146 through the reversing switch 128, through the closed switch 122, into the positive terminal 156 of the second battery 92, out of the negative terminal 158, through the switch 160 to the positive terminal 116 of the first battery 90 and thence to ground. This reverse flow provides a regenerative braking effect as described above and simultaneous recharging of both batteries 90, 92 in series. The high-speed operative circuit is automatic in providing regenerative braking above the nominal high speed (i.e., where back EMF approximately equals the voltage of both batteries 90, 92 in series; the circuit automatically prevents free coasting which may be difficult to control if allowed above the nominal high speed. Thus, by simultaneous depression of the High- and Low-Speed buttons 178, 180 the circuit tends to automatically maintain the nominal high speed with the motor 48 providing either propulsion or braking (and recharging) as required. Release of the High-Speed button 180 immediately reverses the position of the switch 160 and reverts the system to low voltage operation (i.e., 12 volt). At low voltage the Regen button 182 is effective again to provide regenerative braking down to the nominal low speed, i.e., approximately 7 mph.

The direction 70 of propulsion of the vehicle 10 is reversed as desired by the operator by manual operation of the double-pole, double-throw switch 128 so as to connect the positive motor terminal 146 to ground via the lead 134 and connect the negative motor terminal 144 to the leads 184, 133 to the batteries 90, 92. Thereby, operation of Low-Speed switch 122 energizes the motor in the reverse direction and the tricycle is propelled reversely.

The size and relative diameters of the sprocket wheels in the pedal system are selected in the manner and for purposes known in the art to achieve desired vehicle performance characteristics and are not considered part of this invention. The motor 48, its speed characteristics, ratios in the gear box 50, and the diameters of the sprocket wheels 56, 58 are selected to provide a safe maximum design speed at 24-volt DC input, and a suitable intermediate speed at 12-volt DC input for cruising. Depending upon the intended application of the vehicle 10, e.g., shopping and local communication, light freight delivery, etc., the electrical components and mechanical gear ratios will vary. For local residential and light freight usage a 24-volt motor rated at approximately 0.4 horsepower, incorporating a gear box, e.g., model 01390-27 M030 GM by American Bosch Corp., providing an approximate five-to-one step-down ratio in speed, and connected to 24-inch diameter rear wheels by sprockets providing an approximate 3.5 to 1 decrease in speed, has given satisfactory performance. At 12-volt DC input, speed is approximately 7 mph on a level road and with normal coasting range is in the order of 20 miles without recharging the batteries. With 24-volt DC input a speed of approximately 14 mph is achieved on a level surface with a range in the order of 35 miles. Combined battery and pedal power will extend the range. Commercially available 12-volt automotive batteries, e.g., Model EC-24by ESB Corp. have operated satisfactorily.

Except for the batteries, switches, and geared motor, all other electrical components and interconnecting wiring have been omitted from the figures for the sake of clarity in presentation. These elements including relays and diodes are located on the framework structure 60 and in the space generally between the batteries 90, 92 and under a protective covering (not shown).

Various modifications of this invention may be made and will be apparent from the foregoing description which is presented by way of illustration of and not as a limitation on the scope of this invention.

For example, in an alternative embodiment, the circuitry may be modified to provide an additional mode of operation wherein depression of a control button provides a short circuit of the electric motor whereby dynamic braking is provided at all speeds including those below the nominal low speed, i.e., 7 mph, described above.

Also, a large plurality of batteries may be used in multiple arrays in series and parallel with diodes and switches between each battery arranged as in the embodiment described above, e.g., diodes 118, 152 and switch 160 between the pair of batteries 90, 92, so that by actuating switches or not the batteries may operate all in parallel for low-power long-life operation or all in series for high-power operation and at any intermediate combination of series and parallel groupings. Thus, an electric vehicle may be provided with a wide range of operating speeds variable in relatively small increments.

Further, in other embodiments a conventional key-operated ignition switch may be incorporated to provide a measure of safety and prevent unauthorized vehicle usage. Conventional mechanical handbrakes may replace or supplement the coaster brake mechanism described above. For other applications, the gear reducer may be separate from the motor or not required at all or the motor may use a clutch mechanism to vary speed ratios during starts, on hills, etc., and a conventional multispeed shift drive may be incorporated in the pedaling system. Additionally the permanent magnet motor may be replaced by another type of DC motor which is maintained continuously magnetized to provide dynamic braking.

What is claimed is:

1. An electric-powered cycle for carrying an operator comprising
   a steerable wheel;
   an electric motor drive for a wheel of said cycle;
   battery means including a plurality of batteries for energizing said motor; and
   a circuit including
   (a) manually-operated speed switch means for selectively connecting said batteries in parallel and series circuits for energization of the motor to provide respectively for low and high speeds and for supplying current from said battery means to said motor to drive said wheel.
   (b) one electronic unidirectional circuit means for blocking current generated by the motor when the back EMF exceeds the voltage of said battery means in the low speed condition whereby free coasting of the cycle above said low speed is permitted in the absence of regenerative braking action;
   (c) manually-operated regenerative-braking switch means operable concurrently with said speed switch means for bypassing said one unidirectional circuit means concurrently with said batteries being connected in parallel circuits for low speed to enable regenerative braking action, and including another unidirectional means for conducting only when the back EMF exceeds the voltage of said battery circuit connected in parallel so that the regenerative braking action, enabled by said regenerative-braking switch means, is effective only at speeds above said low speed whereby the operator can selectively choose to maintain the cycle at the low speed established by said parallel battery circuit by concurrent operation of both said regenerative switch means and said speed switch means in the low speed condition; and
   (d) said speed switch means includes means for bypassing said one unidirectional circuit means when the batteries are connected in series whereby regenerative braking is automatically provided under high-speed energization.

2. The electric-powered cycle recited in claim 1 where said speed switch means for selectively connecting said batteries includes means connected between a terminal of one of said batteries and the opposite polarity terminal of another of said batteries.

3. The electric-powered cycle recited in claim 2 wherein said undirectional circuit means include separate diodes connected between similar terminals of the batteries and oriented to pass forward battery current to the motor.

4. The electric-powered cycle recited in claim 1, wherein all of said switch means include relay-operated switches and manual switches for controlling the energization of the relays thereof from said battery means.

5. The electric-powered cycle recited in claim 1 wherein said third switch means for bypassing further includes said unidirectional means poled oppositely from said batteries, whereby unintended vehicle propulsion is prevented when regenerative braking is enabled.

6. The electric-powered cycle recited in claim 1 wherein the circuit further includes a reversing switch for changing the polarity of voltage applied to said motor.

7. The electric-powered cycle as recited in claim 1, wherein said cycle is a tricycle, said steerable wheel is located at the front, said motor driven wheel is located at the rear, and said cycle includes a pedal drive associated with at least one rear wheel whereby pedal and motor drive is provided separately or in combination.

8. An electric-powered cycle for carrying an operator comprising:
   a steerable wheel;
   an electric motor drive for a wheel of said cycle;
   battery means for energizing said motor;
   a circuit including
   (a) manually operated low speed switch means for supplying current from said battery means to said motor to drive said wheel at low speed,
   (b) one electronic unidirectional circuit means for blocking current generated by the motor when the back EMF exceeds the voltage of said battery means in the low speed condition whereby free coasting of the cycle above said low speed is permitted in the absence of regenerative braking action; and
   (c) manually operative regenerative braking switch means for bypassing said one unidirectional circuit means to enable regenerative braking action and operable concurrently with said low speed switch means and including another unidirectional means poled oppositely from said batteries for conducting only when the back EMF exceeds the voltage of said battery means so that the regenerative braking action enabled by said regenerative braking switch means is effective only at speeds above said low speed whereby the operator can selectively choose to maintain the cycle at the low speed established by said battery means by concurrent operation of both said regenerative switch means and said low speed switch means.

* * * * *